(12) United States Patent
Mi et al.

(10) Patent No.: US 9,496,746 B2
(45) Date of Patent: Nov. 15, 2016

(54) WIRELESS POWER TRANSMISSION FOR BATTERY CHARGING

(71) Applicant: The Regents of The University of Michigan, Ann Arbor, MI (US)

(72) Inventors: Chris Mi, Detroit, MI (US); Siqi Li, Dearborn, MI (US); Trong-Duy Nguyen, Dearborn, MI (US); Junhua Wang, Dearborn Heights, MI (US); Jiangui Li, Dearborn Heights, MI (US); Weihan Li, Westland, MI (US); Jun Xu, Inkster, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 269 days.

(21) Appl. No.: 14/277,288

(22) Filed: May 14, 2014

(65) Prior Publication Data

US 2014/0340031 A1    Nov. 20, 2014

Related U.S. Application Data

(60) Provisional application No. 61/823,559, filed on May 15, 2013.

(51) Int. Cl.
*H02J 7/00* (2006.01)
*H02J 7/02* (2016.01)
(Continued)

(52) U.S. Cl.
CPC ............ *H02J 7/025* (2013.01); *B60L 11/1829* (2013.01); *H01F 3/10* (2013.01); *H01F 27/2871* (2013.01); *H01F 27/40* (2013.01); *H01F 38/14* (2013.01); *H02J 5/005* (2013.01); *H02J 7/0042* (2013.01); *H02J 7/0054* (2013.01); *H02J 17/00* (2013.01); *H02J 50/00* (2016.02); *H02J 50/10* (2016.02);
(Continued)

(58) Field of Classification Search
CPC .......... H02J 7/025; H02J 5/005; H02J 17/00; H02J 50/00; H02J 50/10; H02J 7/0042; H02J 7/0054; B60L 11/829; B60L 11/1829; H01F 27/2871; H01F 38/14; H01F 27/40; H01F 3/10
USPC .................................................. 320/108, 103
See application file for complete search history.

(56) References Cited

U.S. PATENT DOCUMENTS 5,311,973 A    5/1994  Tseng et al.
5,619,078 A    4/1997  Boys et al.
(Continued)

OTHER PUBLICATIONS

N. Keeling, et al "A Unity-Power-Factor IPT Pickup for High-Power Applications", IEEE Transactions on Industrial Electronics, vol. 57, No. 2, (Feb. 2010).

*Primary Examiner* — Nathaniel Pelton
(74) *Attorney, Agent, or Firm* — Harness, Dickey & Pierce, PLC

(57) ABSTRACT

A wireless power transmission system is provided for high power applications. The power transmission system is comprised generally of a charging unit configured to generate an alternating electromagnetic field and a receive unit configured to receive the alternating electromagnetic field from the charging unit. The charging unit includes a power source; an input rectifier; an inverter; and a transmit coil. The transmit coil has a spirangle arrangement segmented into n coil segments with capacitors interconnecting adjacent coil segments. The receive unit includes a receive coil and an output rectifier. The receive coil also has a spirangle arrangement segmented into m coil segments with capacitors interconnecting adjacent coil segments.

18 Claims, 18 Drawing Sheets

(51) Int. Cl.
*H02J 17/00* (2006.01)
*H01F 38/14* (2006.01)
*H01F 3/10* (2006.01)
*H01F 27/28* (2006.01)
*H01F 27/40* (2006.01)
*B60L 11/18* (2006.01)
*H02J 5/00* (2016.01)

(52) U.S. Cl.
CPC ......... *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 6,806,710 B1 | 10/2004 | Renz et al. | |
| 6,943,551 B2 | 9/2005 | Eberler et al. | |
| D611,900 S | 3/2010 | Yang | |
| 7,825,537 B2 | 11/2010 | Freer | |
| 7,825,543 B2 | 11/2010 | Karalis et al. | |
| 7,863,861 B2 | 1/2011 | Cheng et al. | |
| 7,923,995 B2 | 4/2011 | Schulz | |
| 8,183,828 B2 | 5/2012 | Tanabe | |
| 2007/0182367 A1 | 8/2007 | Partovi | |
| 2008/0188090 A1* | 8/2008 | Chen | H01J 37/321 438/778 |
| 2009/0015075 A1 | 1/2009 | Cook et al. | |
| 2010/0073000 A1* | 3/2010 | Ludwig | G01R 33/34061 324/318 |
| 2010/0231163 A1 | 9/2010 | Mashinsky | |
| 2011/0101788 A1 | 5/2011 | Sun et al. | |
| 2011/0127953 A1 | 6/2011 | Walley et al. | |
| 2011/0181240 A1* | 7/2011 | Baarman | B60L 11/182 320/108 |
| 2011/0193421 A1* | 8/2011 | Urano | H01F 38/14 307/104 |
| 2011/0254377 A1 | 10/2011 | Wildmer et al. | |
| 2012/0019075 A1 | 1/2012 | Cho et al. | |
| 2012/0169279 A1* | 7/2012 | Kim | H02J 7/025 320/108 |
| 2012/0228955 A1 | 9/2012 | Endo et al. | |
| 2012/0248882 A1 | 10/2012 | Urano | |
| 2012/0256585 A1 | 10/2012 | Partovi et al. | |
| 2012/0318586 A1* | 12/2012 | Atarashi | B60L 5/005 180/2.1 |
| 2013/0119781 A1* | 5/2013 | Takada | B60L 11/182 307/104 |
| 2014/0152114 A1* | 6/2014 | Kim | H04B 5/0093 307/104 |
| 2014/0246922 A1* | 9/2014 | Ichikawa | B60L 11/182 307/104 |
| 2015/0054350 A1* | 2/2015 | Covic | H01F 38/14 307/104 |

\* cited by examiner

WIRELESS POWER TRANSMISSION FOR BATTERY CHARGING

CROSS-REFERENCE TO RELATED APPLICATIONS

This application claims the benefit of U.S. Provisional Application No. 61/823,559, filed on May 15, 2013. The entire disclosure of the above application is incorporated herein by reference.

GOVERNMENT CLAUSE

This invention was made with government support under grant DE-EE0002720 awarded by the Department of Energy. The Government has certain rights in this invention.

FIELD

The present disclosure relates to a wireless power transmission for battery charging.

BACKGROUND

Dependence on fossil fuel of human being, shocking oil price increase and environmental awareness have driven strong development and deployment of electric vehicles (EVs). EVs' batteries can be recharged by connecting to the grid. Recently, to charge such batteries, the most common way is conductive connection between batteries and chargers; the power is transferred by a copper cable connected to the grid. However conductive connection has many drawbacks, such as: (a) risk of electric shock to users, (b) fire hazards, (c) short-circuit and (d) inconvenience for users.

Contrary to traditional conductive charging, wireless charging is safe, convenient and autonomous for electric vehicles. Wireless charger is safe for users as it is innately isolated from the grid. It transfers power via a large gap from transmitting coils to receiving coils mounted on the vehicle. Wireless charging can be done without any inconvenience caused by bundle of cables, connectors and plugs. Therefore it becomes an autonomous charging system.

Current wireless power technique can be classified into two types: (1) magnetic resonance and (2) inductive transfer. Magnetic resonance using radio wave often operates at frequencies of hundreds of MHz to GHz level. This allows the application of this method at greater distances. However this technique can be mainly used in signal transmission; it is almost impossible to apply this technique in power applications. Magnetic resonance using frequency range of around a few Mhz usually has low coupling factors (below 0.1). Beside that magnetic resonance charging operate at this frequency level intensifies electromagnet compatibility (EMC) problems and also makes it challenging for power electronic converters used with the chargers.

Conventional inductive transfer has been utilized in home appliances and electronic gadgets such as electric shavers, mobile phones, cameras; however operating range of these applications limits within some centimeters range. Inductive power transfer using near-field magnetic resonance phenomenon is relatively novel technique. This technique uses an intermediate range of frequency and it is attractive for power applications, such as wireless power chargers for battery system in electric vehicles, as it can transmit high power effectively at the range of several decimeters to meters. For such inductive transfer system, the resonant frequency can be properly tuned by connecting with an external capacitor. Nevertheless in such system, the voltage in the sending coil and the capacitor can easily reach thousands of volts at the resonant frequency. This high voltage prevents an implementation of a practical inductive power transfer, especially for high power applications.

This section provides background information related to the present disclosure which is not necessarily prior art.

SUMMARY

This section provides a general summary of the disclosure, and is not a comprehensive disclosure of its full scope or all of its features.

A wireless power transmission system is provided for high power applications. The power transmission system is comprised generally of a charging unit configured to generate an alternating electromagnetic field and a receive unit configured to receive the alternating electromagnetic field from the charging unit. The charging unit includes a power source; an input rectifier; an inverter; and a transmit coil. The transmit coil has a spirangle arrangement segmented into n coil segments with capacitors interconnecting adjacent coil segments. The receive unit includes a receive coil and an output rectifier. The receive coil also has a spirangle arrangement segmented into m coil segments with capacitors interconnecting adjacent coil segments.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
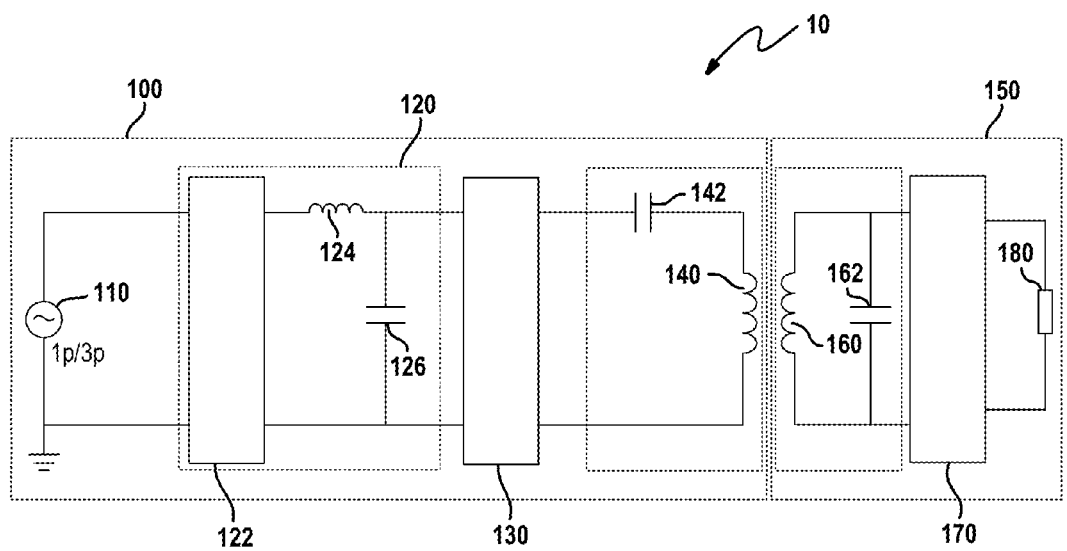
FIG. 1 is a schematic of an example wireless power transmission system.

FIG. 1 depicts an example wireless power transmission system 10. The wireless power transmission system 10 is comprised generally of a charging unit 100 and a receive unit 150. The charging unit 100 is configured to generate an alternating electromagnetic field; whereas, the receive unit 150 is configured to receive the alternating electromagnetic field from the charging unit. In one embodiment, the charging unit 100 is implemented as a pad for placement in a garage and the receive unit 150 is coupled to the underside on an electric or hybrid electric vehicle. Other applications for the power transmission system 10 also fall within the scope of this disclosure.

The charging unit 100 includes a power source 110, a rectifier 120, an inverter 130 and a transmit coil or circuit 140. The rectifier 120 is configured to receive an alternating current (AC) input signal from the power source 110 and convert the AC input to a direct current (DC) power. In one embodiment, the rectifier 120 includes a diode bridge 122, an input inductor 124 and an input capacitor 126. Other circuit arrangements for the rectifier 120 are contemplated by this disclosure.

The inverter 130 is configured to receive the DC power from the rectifier 120 and convert the DC power to an AC output signal at a desired resonant frequency. The transmit coil 140 in turn receives the AC output signal from the inverter 130 and generates an alternating electromagnetic field. Various circuit arrangements for the inverter are also contemplated by this disclosure.

One important aspect of this system 10 is the charging unit 100 and the receiving unit 150 working at the designed magnetic resonant frequency. This resonant frequency can be obtained by connecting the transmit coil 140 with a lumped capacitor 142 in series and the receive coil 160 with a capacitor 162 in parallel. It can also be obtained by other ways, both transmit coil and receive coil can be connected with a capacitor in series or in parallel. For the system described above, the lumped capacitor 142 in the charging unit 100 can be replaced by a set of distributed capacitors interconnecting coil segments as will be described below. Depending on the design, high voltage can be accommodated on the sending side or the receiving side or both of them; that is, the distributed capacitors can be used on the high voltage side to reduce the voltage level in each coil segment to an acceptable level.

The receiving unit 150 includes the receive coil 160, an output rectifier 170 and the targeted load 180 (e.g., a battery). An output capacitor 162 is coupled in parallel with the receive coil 160. The receive coil 160 receives energy at the design resonant frequency from the alternating electromagnetic field generated by the charging unit 100. The rectifier 170 in turn converts the energy into a DC charging signal. Various circuit arrangements for the rectifier 170 are contemplated by this disclosure.

Figure 2:
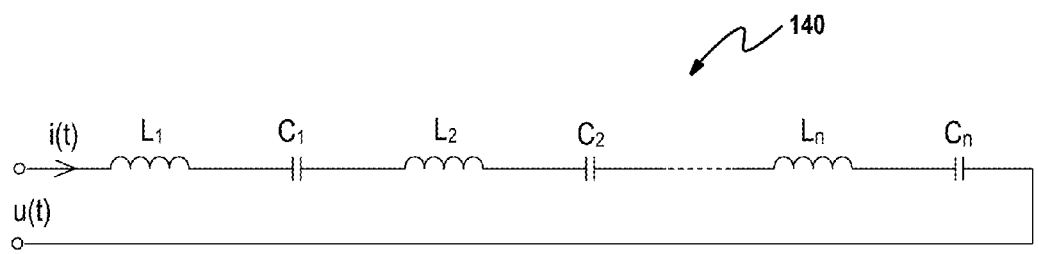
FIG. 2 is a schematic of an example transmit coil having coil segments interconnected by distributed capacitors.

In high power applications, voltage in the transmit coil and its capacitor can easily reach thousands of volts at the resonant frequency. This high voltage prevents an implementation of a practical inductive power transfer. To reduce peak voltage, instead of using a single lumped capacitor in the transmit coil, a set of distributed capacitors can be used as shown in FIG. 2. That is, the transmit coil can be segmented into a plurality of smaller segments L1, L2 . . . Ln. Each coil segment is connected in series with the other segments by a capacitor C1, C2 . . . Cn, thereby interconnecting adjacent coil segments. By using this method, a desired resonant frequency can be obtained but the voltage in each segment of the coil and in each capacitor is reduced by n times, where n is the number of segments. The number of segments and capacitors depends on the design. This approach facilitates the implementation of a practical inductive power transfer system as there are no (or very few) high-voltage capacitors. It is understood that this approach can also be applied to the receive coil.

In some embodiments, the length of each coil segment is preferably sized to distribute voltage in the capacitors evenly. One technique for sizing the segment lengths is to apply a high frequency signal to the transmit coil and measure the voltage distribution on the coil. Based on such voltage measures, the coil could be cut into segments such that the voltage is distributed evenly on each segment. In the case of an enameled coil, a non-isolated copper coil could be used as a duplicate in place of the transmit coil for purposes of making this determination. Alternatively, the cut points for the coil could be computed using simulation. In either case, the peak voltage in the whole coil can be minimized.

Figure 3A:
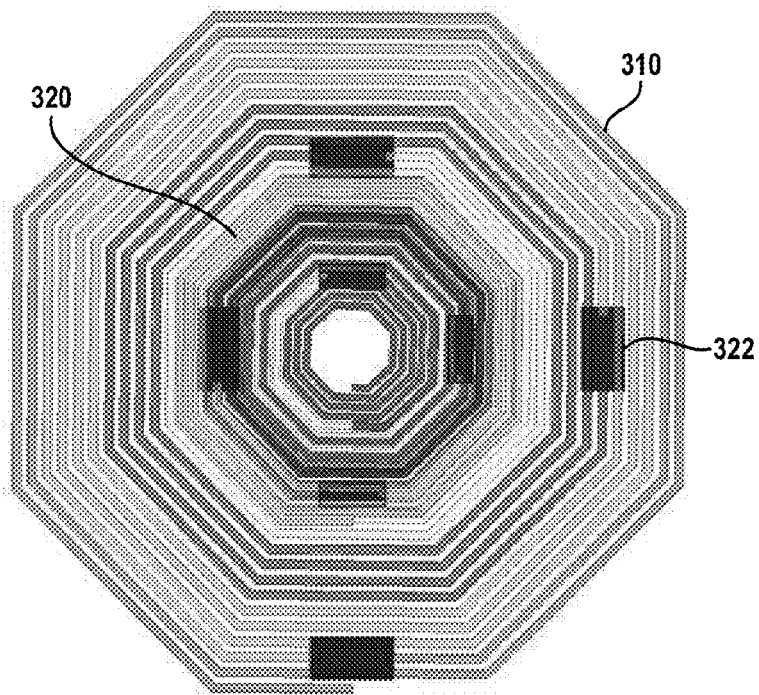
FIG. 3A is a top view depicting an example coil arrangement for use in the wireless power transmission system.
Figure 3B:
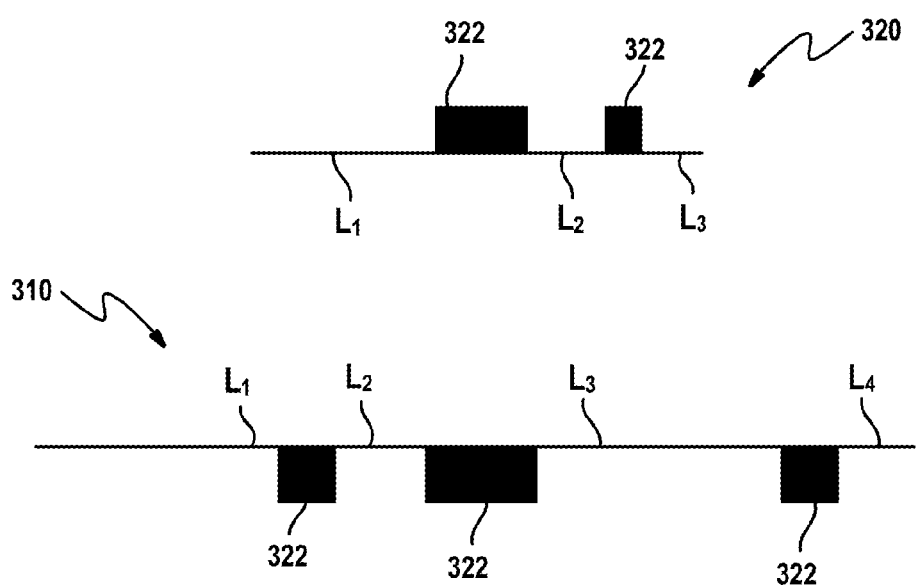
FIG. 3B is a side view depicting the example coil arrangement shown in FIG. 3A.

FIGS. 3A and 3B depict an example embodiment of a transmit coil 310 and a receive coil 320. Each coil has a spirangle arrangement with a polygon shape. More specifically, each coil is in the shape of an octagon although polygons having more or less sides are also contemplated by this disclosure. In this example embodiment, the transmit coil 310 is divided into four segments; whereas, the receive coil 320 is divided into three segments. Likewise, the coils may be divided into more or less segments. In any case, adjacent segments are interconnected by capacitors 322.

Figure 4A:
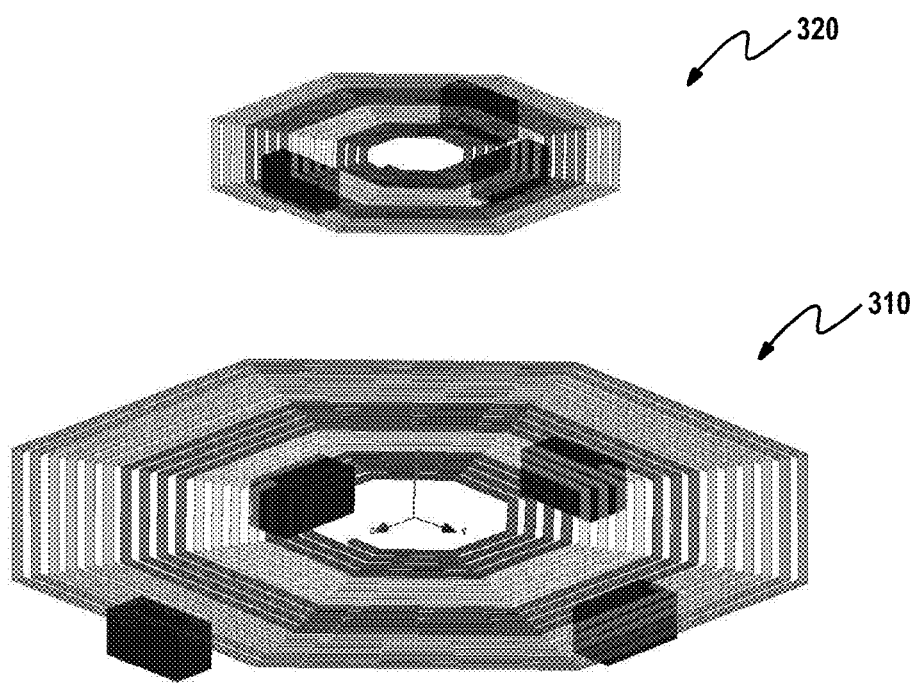
FIGS. 4A-4C are perspective views of example coil arrangements having varying dimensions.
Figure 4B:
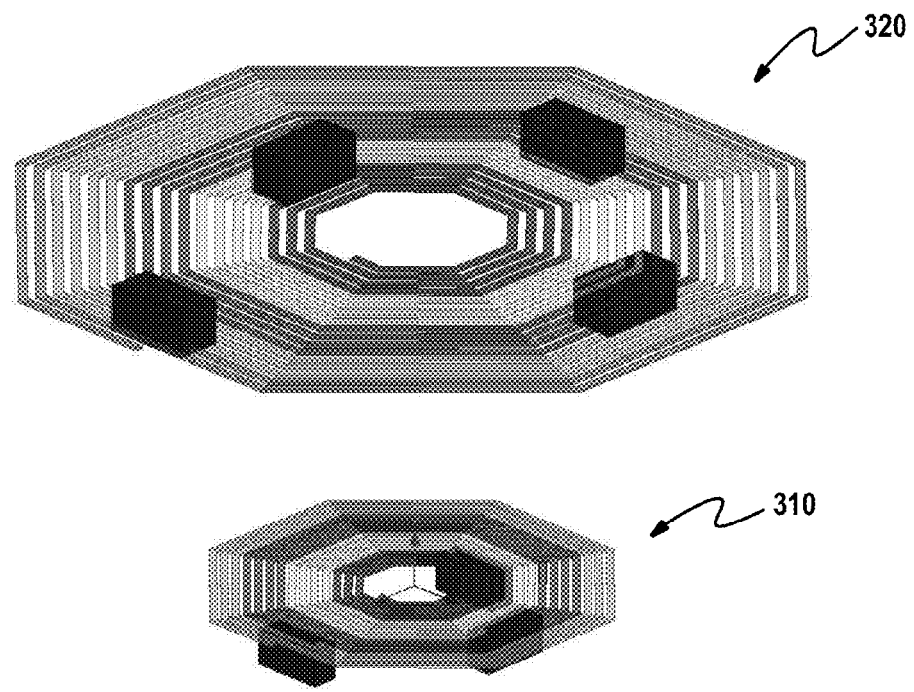
Figure 4C:
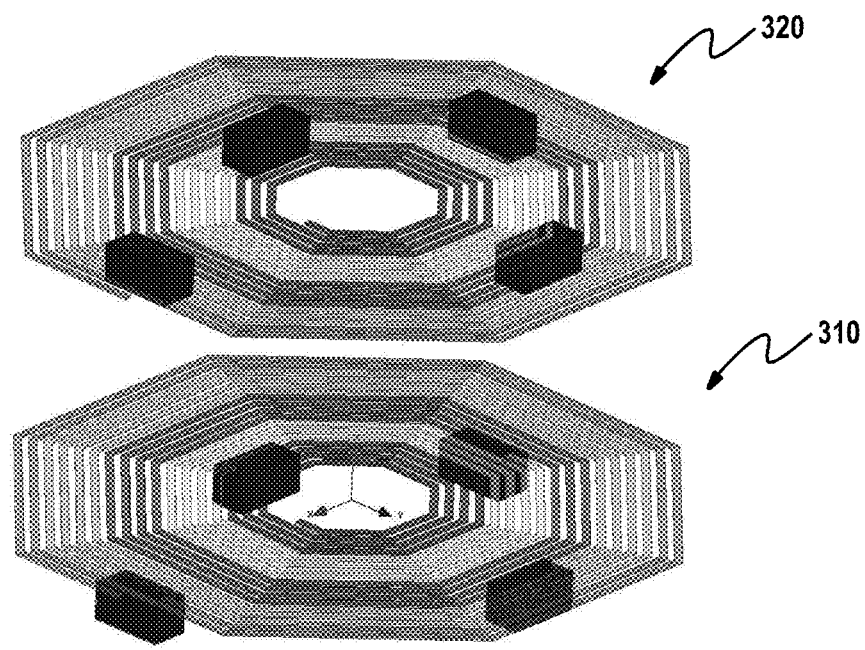

FIG. 4A depicts a transmit coil 310 that is larger than the receive coil 320. FIG. 4B depicts a receive coil 320 that is larger than the transmit coil 310. FIG. 4C depicts a transmit coil 310 and a receive coil 320 having substantially the same sizes. Thus, the sizes of the coils may vary in relation to each other depending on the application and the particular design criteria.

Figure 5A:
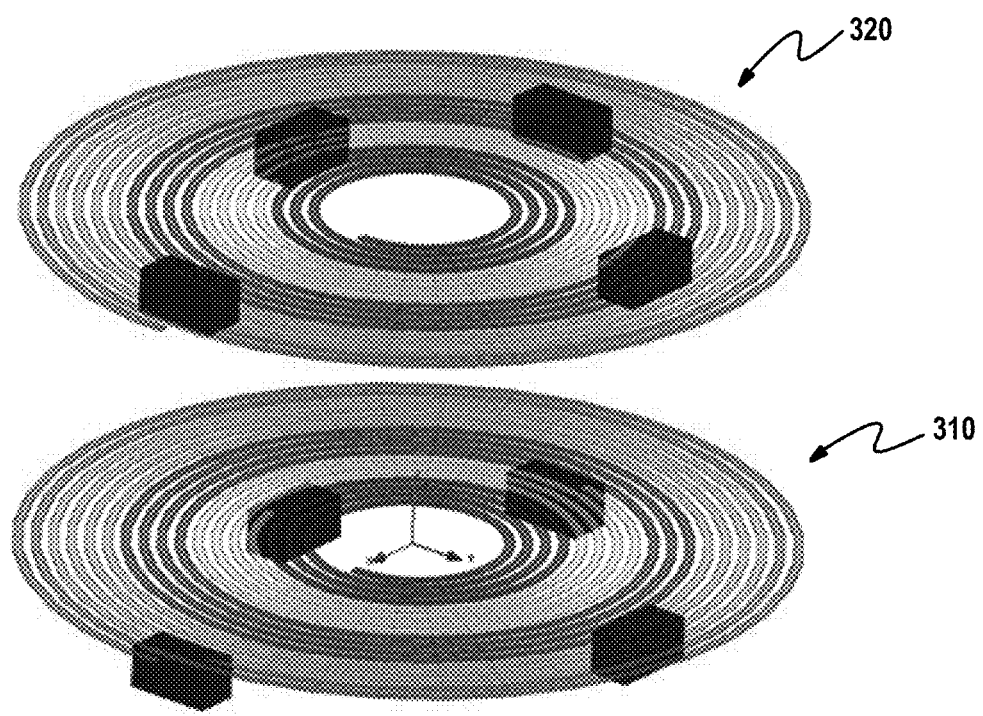
FIG. 5A-5C are perspective view of example coil arrangements having varying shapes.
Figure 5B:
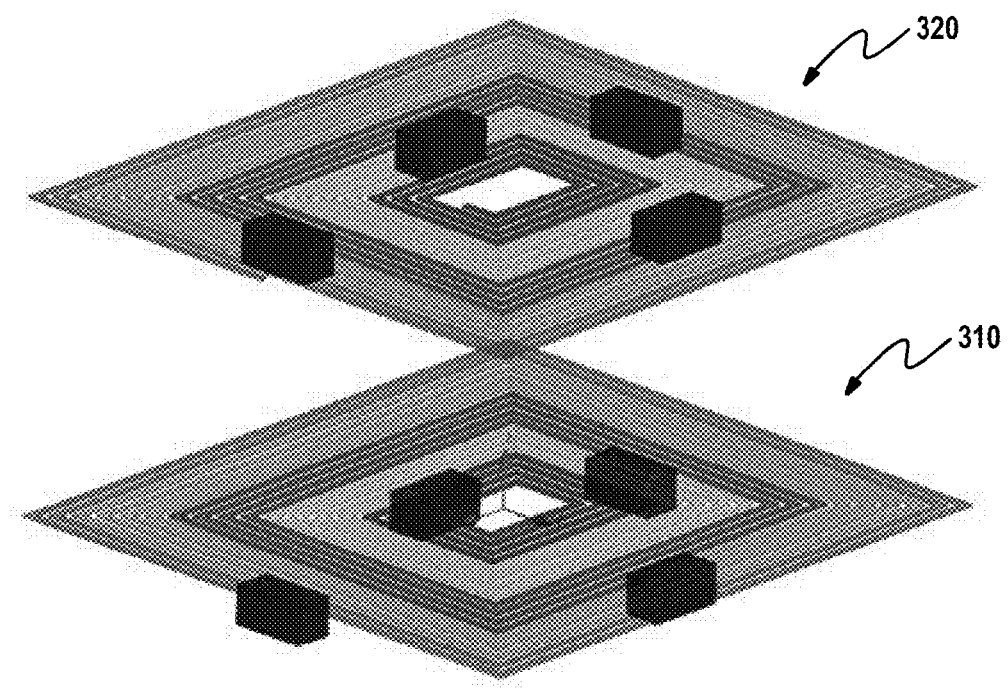
Figure 5C:
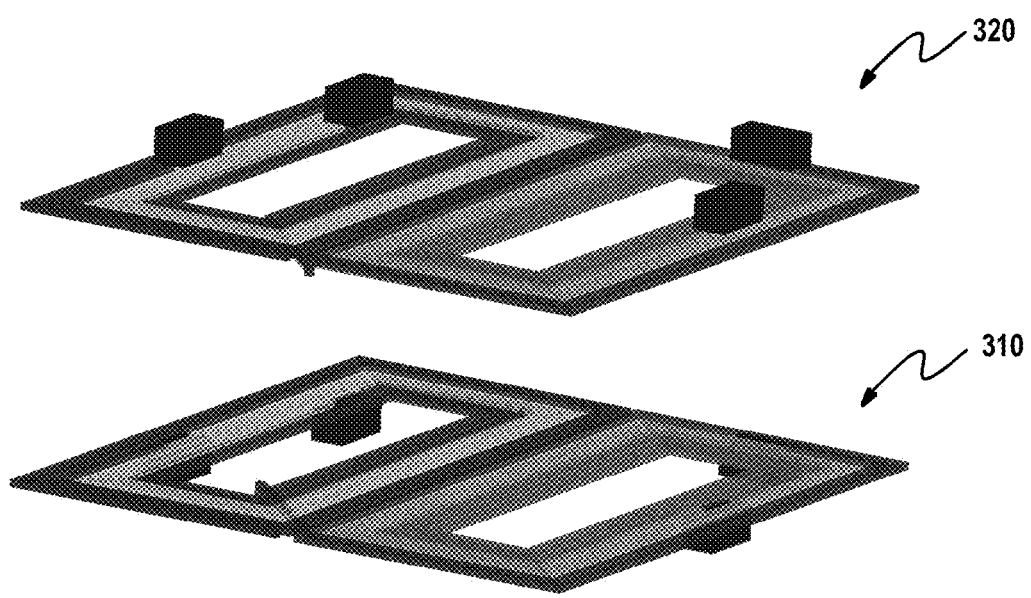

FIGS. 5A-5C depict example embodiments of transmit and receive coils having different geometric shapes. In FIG. 5A, the transmit coil 310 and the receive coil 320 have a spirangle arrangement with a circular shape. In FIG. 5B, the transmit coil 310 and the receive coil 320 have a spirangle arrangement with rectangular shape. In FIG. 5C, the transmit coil 310 and the receive coil 320 are DD type coils. More specifically, each coil is comprised of two spirangle arrangements interconnected and adjacent to each other. The spirangle arrangements are further defined as having a rectangular shape although other shapes are contemplated as well. This arrangement is also referred to as a bipolar coil. The coils can be divided into segments and interconnected by capacitors in the manner described above. In any of these cases, the number of coil segments as well as the number, value and position of the capacitors 322 depend upon the particular design criteria.

Figure 6A:
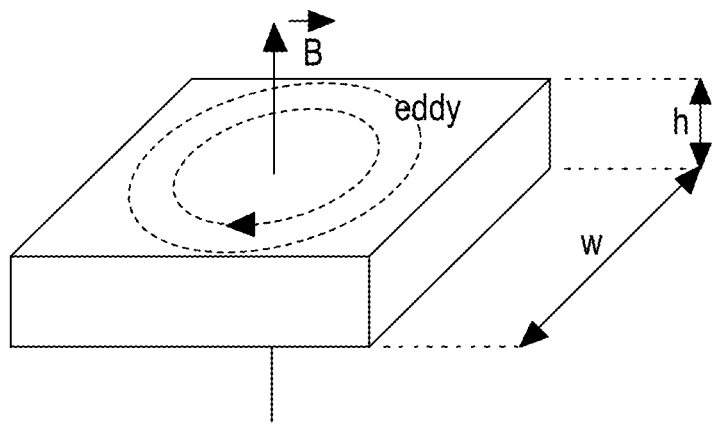
FIGS. 6A and 6B are diagrams illustrating Eddy current distribution in a coil segments having different profiles.
Figure 6B:
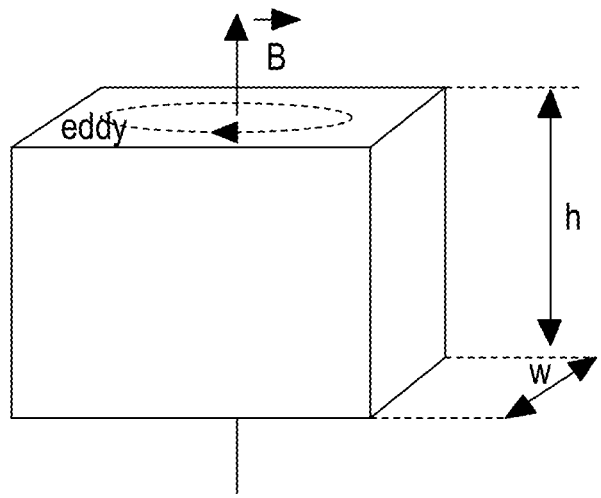
Figure 7A:
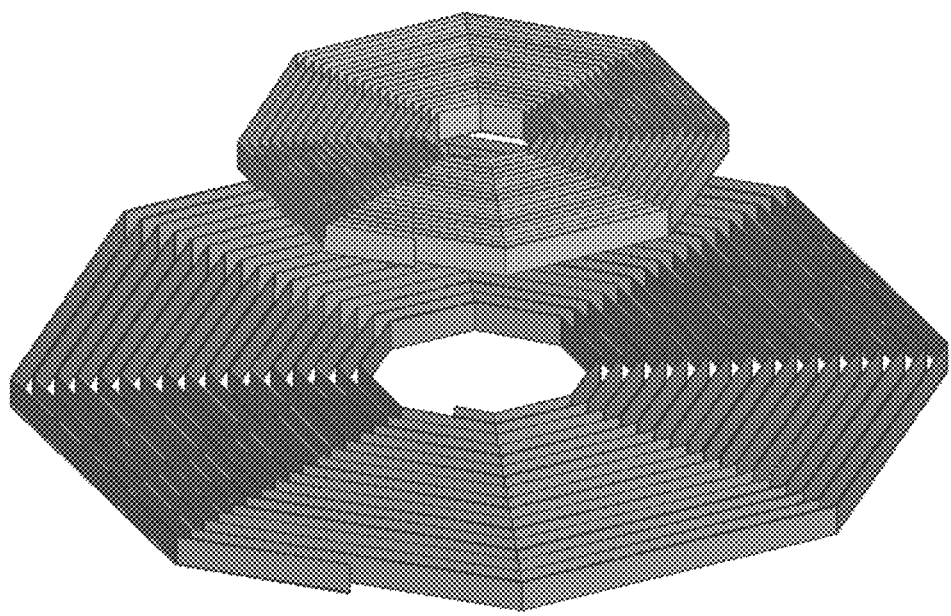
FIGS. 7A-7C are a perspective view, a top view, and a side view of a coil arrangement configured to reduce Eddy current losses.
Figure 7B:
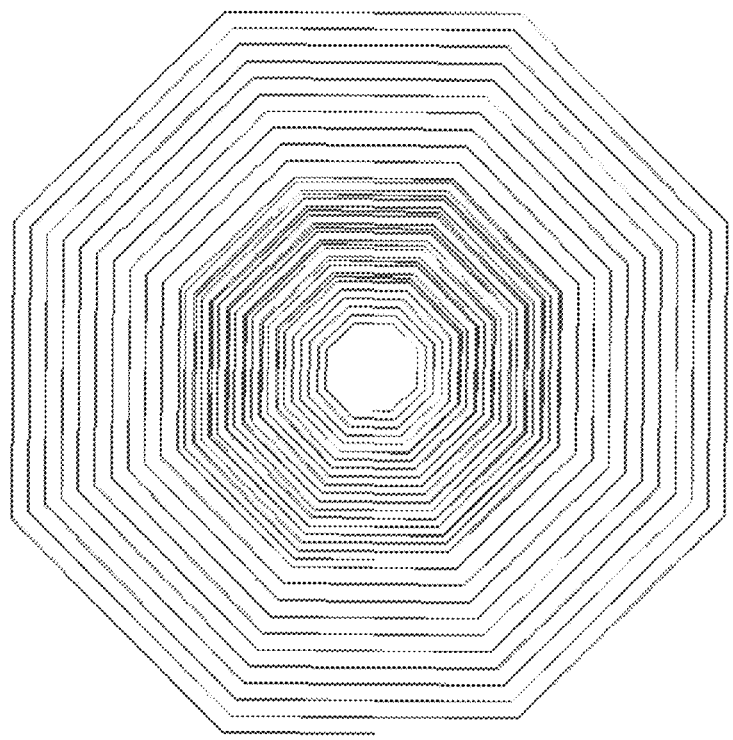
Figure 7C:
Figure 7C:

During operation, both sending and receiving coils operate at the designed resonant frequency. This resonant frequency is often chosen as a relative high value to ensure a specific output power and efficiency. Eddy current losses caused by this high frequency in the coils are inevitable. Therefore, to minimize the Eddy current losses in these coils, the copper shape for the coils can be designed to minimize the area that magnetic field passes through. To ensure that copper coils conduct the same current, they can be chosen to have similar areas but different dimensions in width w and in height h. FIG. 6A illustrates the copper area of a coil segment with large width and small height. In contrast, a copper area of a coil segment with a small width and large height is shown in FIG. 6B. This configuration passes the same amount of current but reduces Eddy current losses. FIG. 7A-7C depict an example embodiment of transmit and receive coils having a small width but a large height, where the height of the coil aligns substantially with a vector representing the magnetic field. It is understood that this design feature may be extended to other embodiments described in this disclosure.

Figure 8A:
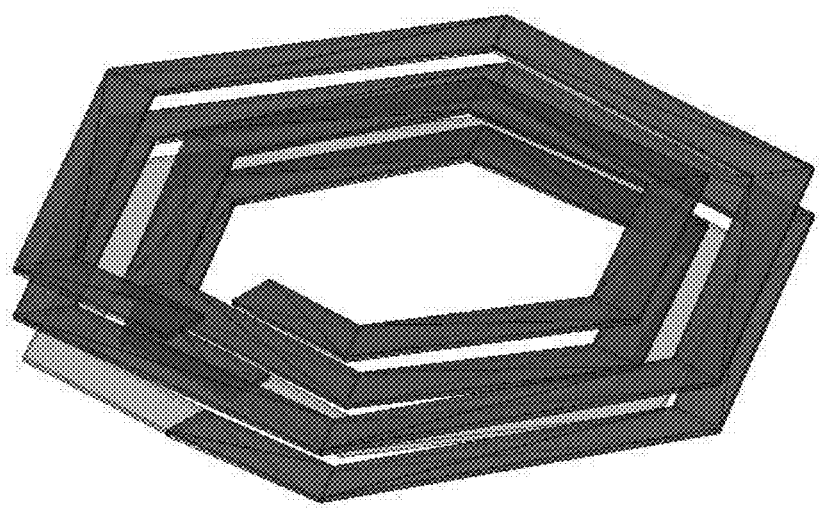
FIGS. 8A-8D are perspective views of coil arrangement having multiple layers.
Figure 8B:
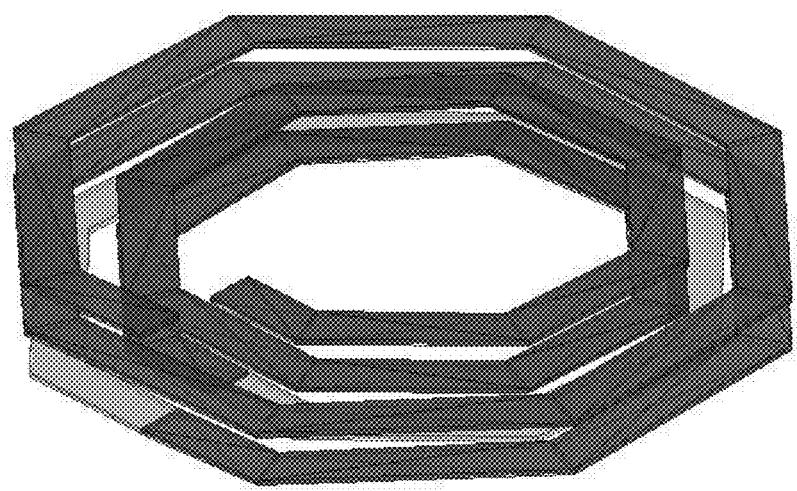
Figure 8C:
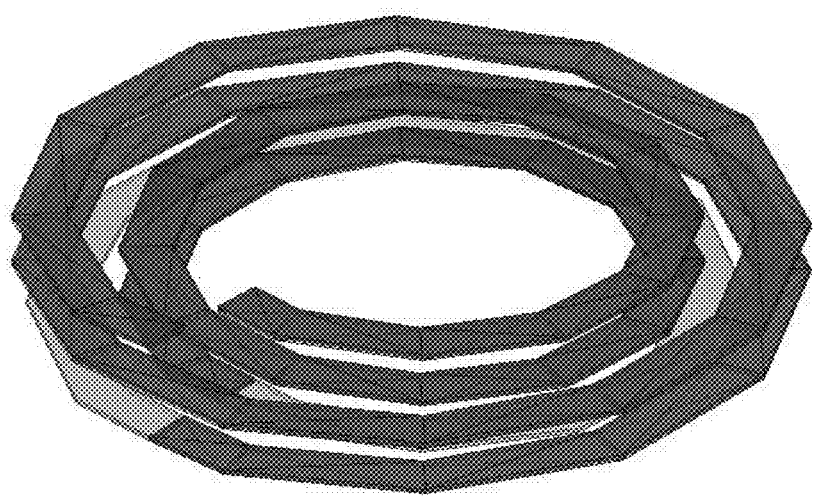
Figure 8D:
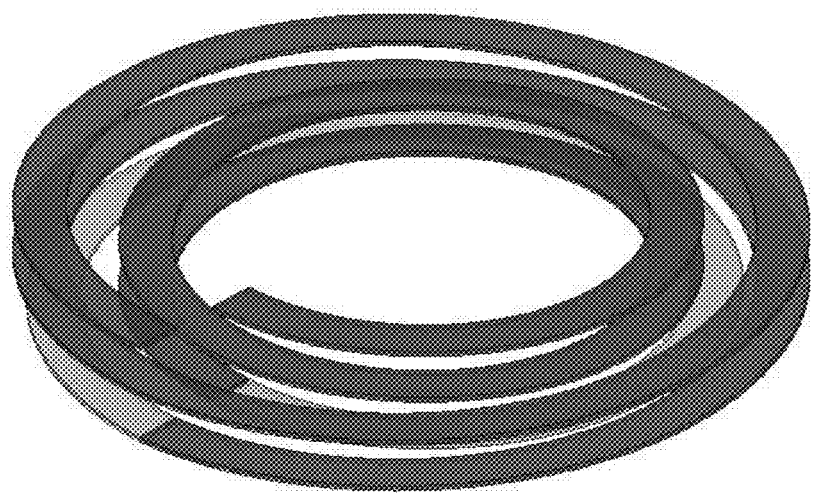

Self-inductance and mutual-inductance are amongst the key parameters in a wireless power transfer system 10. They can be designed to meet specific requirements, such as input voltage, input current, output voltage, output current, input power and output power. One technique for increasing self-inductance is to design coils with multiple layers. Instead of being a single layer, coils can be multi-layer as shown in FIGS. 8A-8D. Self-inductance is increased by $n^2$, where n is the number of layers. Thus, self-inductance is increased nine times in the three layer design shown in the figures. Each layer of the coil can have a finite number of segments such as: 6 segments in FIG. 8A, 8 segments in FIG. 8B, or 12 segments in FIG. 8C. In another embodiment, each layer of the coil can have an infinite number of segments (i.e., a circle) as shown in FIG. 8D. Depending on the design requirements, a coil can be designed with more or less layers.

Figure 9A:
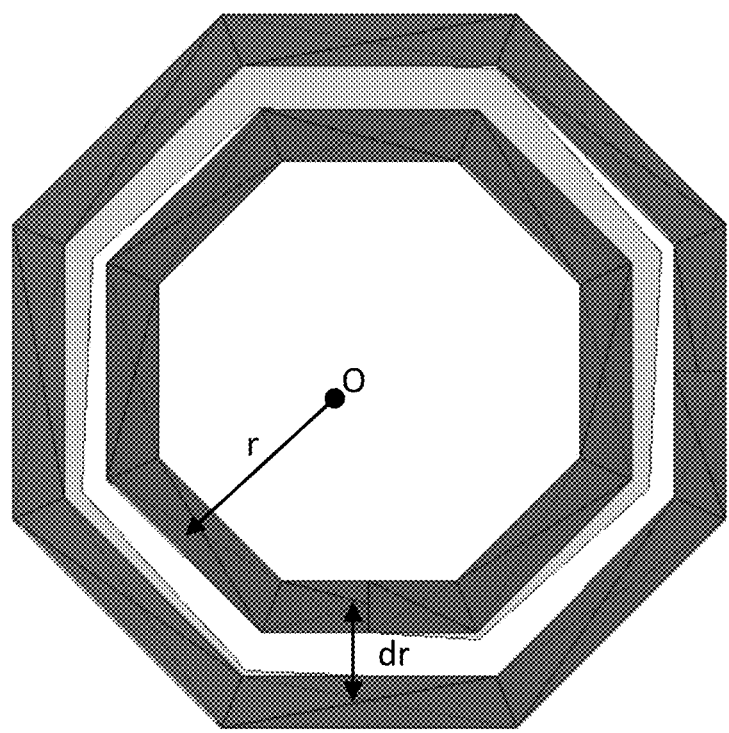
FIGS. 9A and 9B are a top view and a side view of a coil arrangement with multiple layers.
Figure 9B:

Inductances in multi-layer coils are dependent on starting radius, radius change and height between layers, denoted as r, dr and h, respectively, as shown in FIGS. 9A and 9B. Depending on the current being conducted in the coils, thermal distribution in the coils can vary. Therefore, the height between layers can be designed accordingly to meet specific operating conditions and specific cooling methods (e.g., air cooling, water cooling, oil cooling, etc.) in the power transfer system 10.

Figure 10:
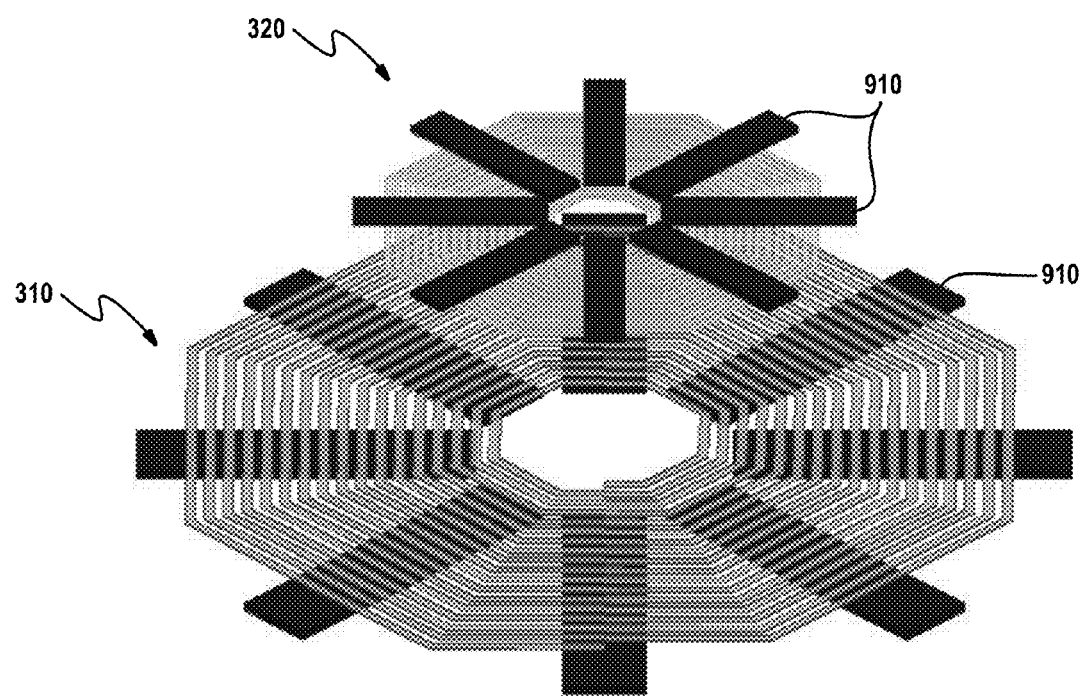
FIG. 10 is a perspective view of an example coil arrangement having magnetic cores.

Self-inductance and mutual-inductance can be further enhanced by adding magnetic cores 910 in the system. The magnetic cores 910 can be added in both sending and receiving sides as illustrated in FIG. 10. This not only increases inductances for the system but also help to increase the main linkage flux between the sending and receiving sides. The optimum shapes and positions to place the magnetic cores 910 can be obtained using repetitive finite element analyses. Magnetic cores 910 can be high-permeability material type such as steel, ferrite or soft-magnetic iron power type which owns a relatively high permeability and small ohmic resistivity as well as other types of magnetic materials.

Figure 11:
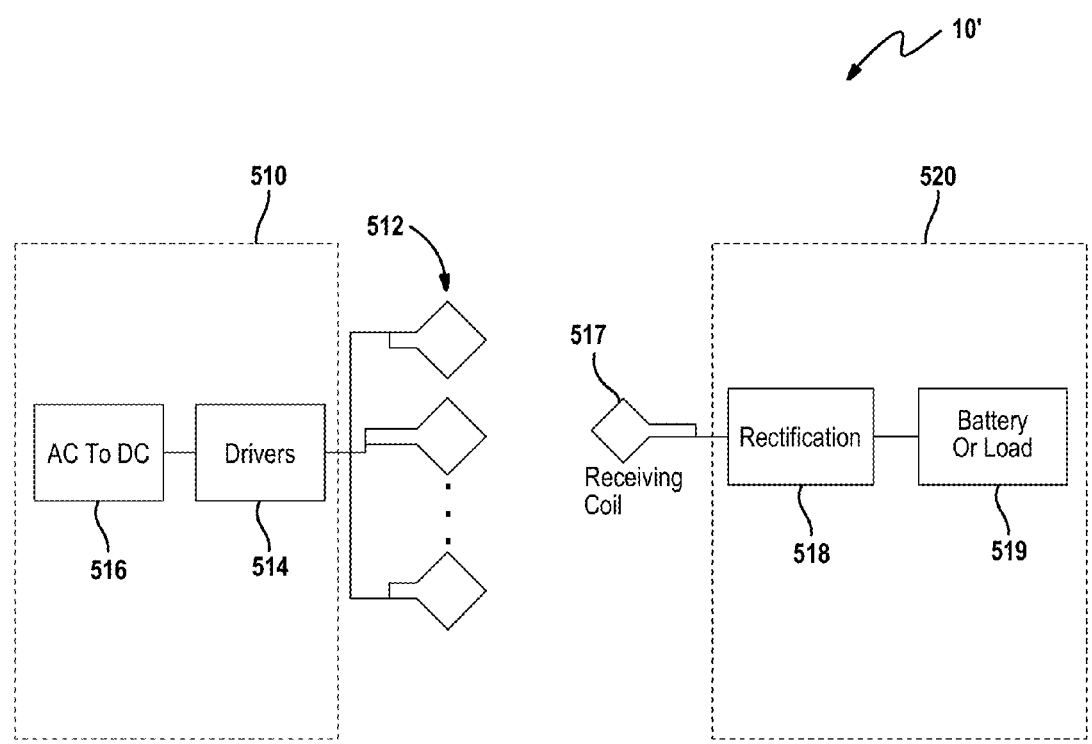
FIG. 11 is a diagram depicting another embodiment of a wireless power transmission system having a charging unit configured with an array of transmitting coils.

FIG. 11 depicts another embodiment of a wireless power transmission system 10'. The wireless power transmission system 10' is comprised generally of a charging (or transmitting) unit 510 and a receive unit 520. Rather than using a single transmit coil, the charging unit 510 is configured with an array of transmitting coils 512. This array of transmitting coils has many advantages, for example, even distribution of magnetic fields, high utilization of space, and separate control of each transmit coil. A driver circuit 514 may be needed to feed a DC input signal to each transmit coil. The driver circuit 514 is interposed between a power conversion circuit 516 and the array of transmitting coils 512. In one embodiment, the power conversion circuit 516 includes a rectifier and an inverter as described above in relation to FIG. 1. The receive unit 520 is likewise comprised of a receive coil 517, a rectifier 518 and a load 519 as described in relation to FIG. 1.

Figure 12:
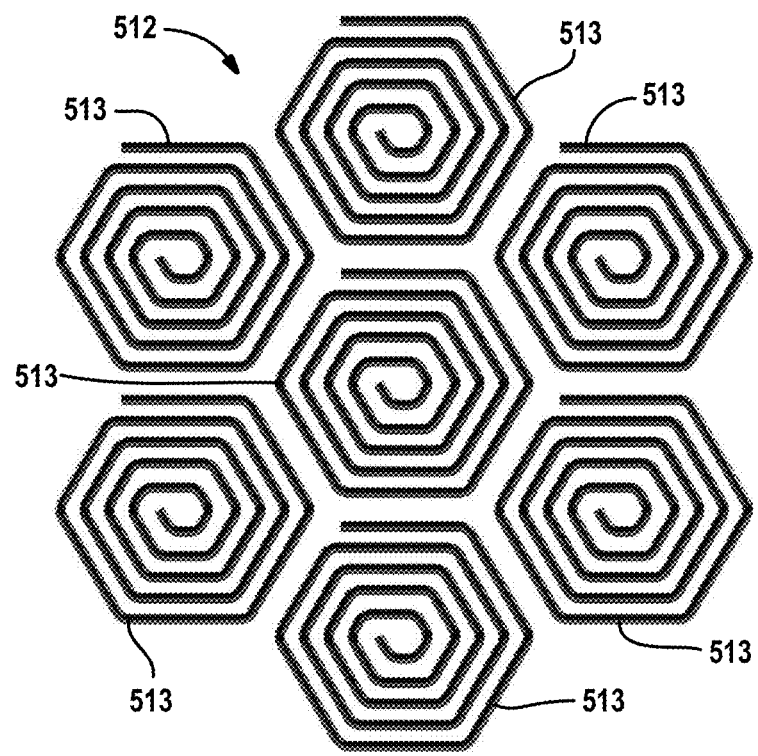
FIG. 12 is a diagram depicting an example embodiment for an array of transmitting coils.

FIG. 12 depicts an example embodiment for the array of transmitting coils 512. In this example embodiment, the array includes seven transmitting coils 513 with six of the coils arranged in a hexagonal shape around the seventh coil. Each coil 513 individually has a spirangle arrangement with a hexagonal shape. The array of transmitting coils 512 can take on different shapes although a symmetrical arrangement is preferred. Likewise, the coils can be different shapes, such as circular, triangular, rectangular, etc.

Figure 13A:
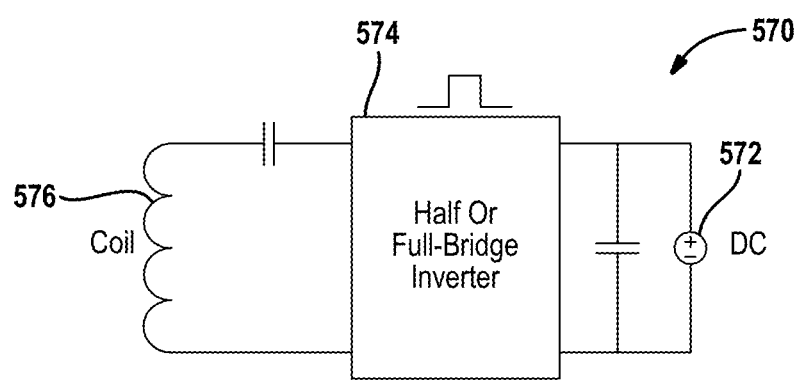
FIGS. 13A-13C are diagrams of receive units further configured to transmit a calibration signal.

On the receive side, the receive unit 520 is further configured to transmit a calibration signal from the receive unit 520 to the charging unit 510. With reference to FIG. 13A, the receive unit 520 may include a calibration transmit circuit 570 for transmitting a calibration signal. In an example embodiment, the calibration transmit circuit 570 includes a DC power source 572 electrically coupled via an inverter 574 to an extra coil 576. The extra coil 576 is in addition to the receive coil 517 and can be used to transmit the calibration signal. During operation, the DC power source 572 generates an input signal for the extra transmit coil 574 which in turn generates an alternating electromagnetic field, preferably at a low frequency.

Figure 13B:
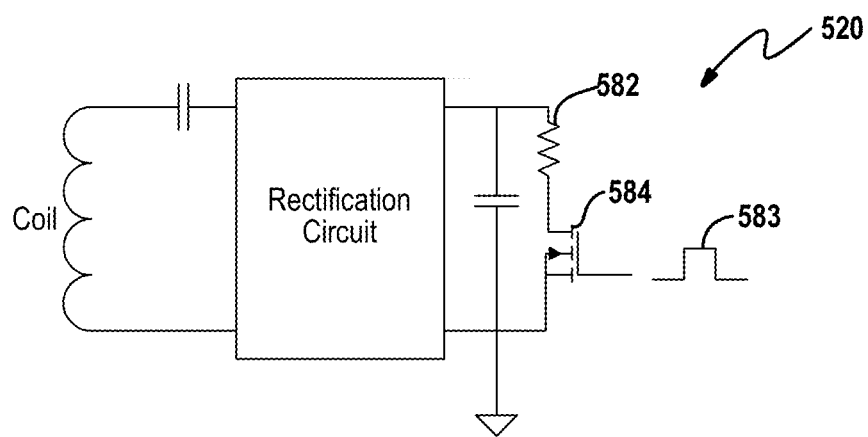
Figure 13C:
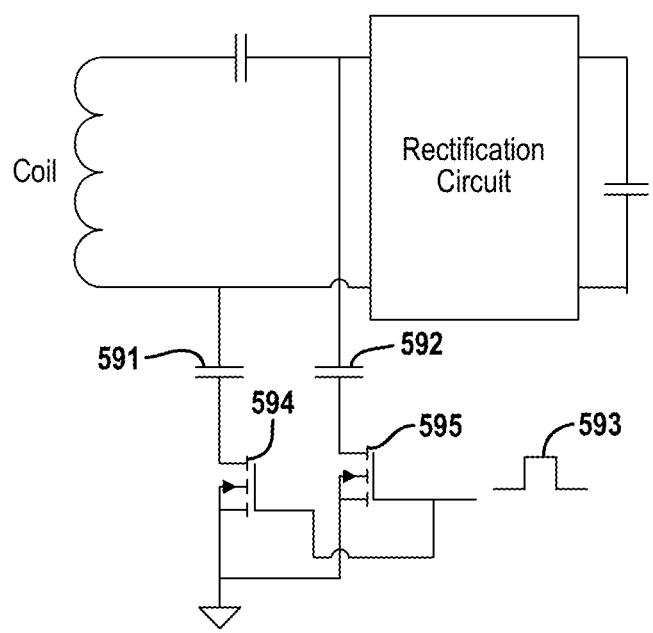

In an alternative approach, backscatter modulation may be used to communicate signal strength between the receive unit 520 and the charging unit 510. In backscatter modulation, the power-receiver coil is loaded, changing the current draw at the power transmitter. Current changes are in turn monitored and demodulated by the charging unit 510. It is envisioned that the modulated impedance network of the receiver side can be either resistive or capacitive. FIG. 13B depicts an example receive unit 520 implementing the resistive modulation approach. In this approach, the resistor 582 periodically provides a low frequency signal 583 to the load by turning on and off of the transistor 584 (e.g., IGBT or MOSFET). FIG. 13C depicts an example receive unit 520 implementing the capacitive modulation approach. In this approach, capacitors 591, 592 periodically provides a low frequency signal 593 to the load by turning on and off the two transistors 594, 595. In either approach, the result is a change in amplitude voltage in the array of transmitting coils 512 residing in the charging unit 510. Because the metal material is sensitive to low frequency signals, the signal can be configured to generate a square wave at a desired low frequency, such as 200 Hz to 20 KHz. Other techniques for transmitting calibration information from the receive unit 520 to the charging unit 510 also fall within the broader aspects of this disclosure.

Figure 14:
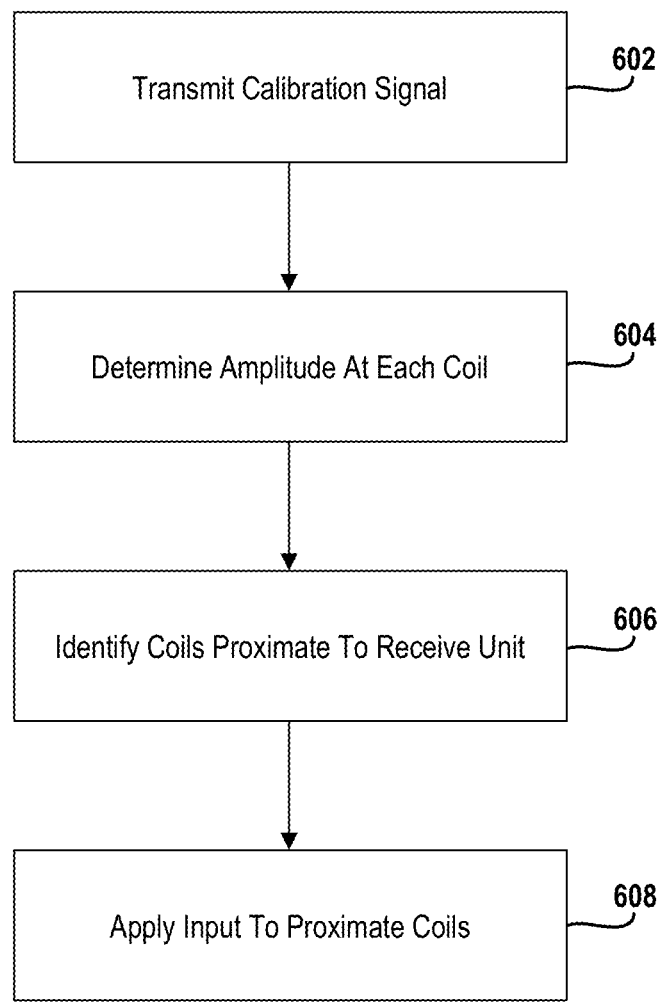
FIG. 14 is a flowchart depicting an example method for improving transmission in a power transmission system.

In another aspect of this disclosure, a method is provided for improving transmission between the charging unit 510 and the receive unit 520 as shown in FIG. 14. Prior to initiating power transmission, a calibration signal is transmitted at 602 from the receive unit 520 to the charging unit 510. Although not limited hereto, the calibration signal may be sent using one of the techniques described above.

Figure 15:
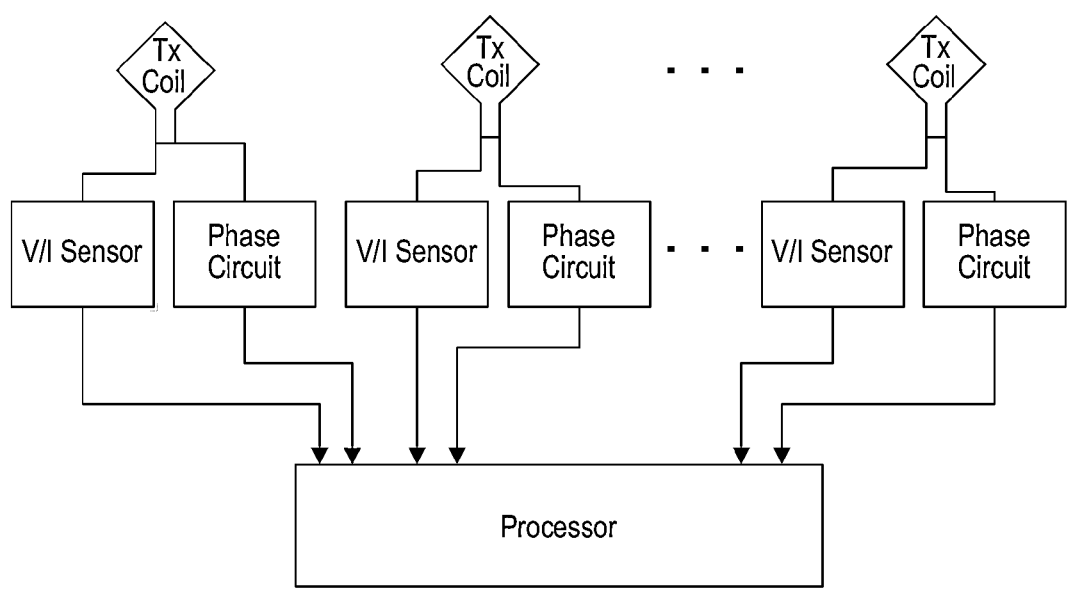
FIG. 15 is a diagram depicting an example arrangement for processing the calibration signal on the charging side.

At the charging unit 510, a determination is made at 604 as to the amplitude of the calibration signal received by each of the coils in the array of transmit coils 512. Depending upon the alignment of the charging unit 510 with the receive unit 520, the strength of the calibration signal will vary amongst the coils in the array of transmit coils 512. For example, in the context of a vehicle charging system, the placement of the electric vehicle in relation to the pad hosting the charging unit 510 may vary each time the vehicle is parked. An example arrangement for processing the calibration signal on the charging side is shown in FIG. 15.

Based on the amplitude of the calibration signal received by each of the transmitting coils, a determination is made at 606 as to which of the transmitting coils are nearest to the receive coil. In one embodiment, the subset of transmitting coils deemed nearest to the receive coil are those whose amplitude exceeds a predefined threshold. In some scenarios, the subset whose amplitude exceeds a predefined threshold may encompass all of the coils in the array of transmitting coils. In another embodiment, the subset of transmitting coils deemed nearest to the receive coil are a fixed number (e.g., four) of coils having the largest amplitude values regardless of whether the values exceeds a threshold. Other techniques for determining the subset of transmitting coils proximate to the receive coil are contemplated by this disclosure.

Rather than energizing all of the coils, an AC input signal is applied at 608 to the subset of coils in the array of transmitting coils deemed nearest to the receive coil. In one embodiment, the AC input signal is applied only to the subset of coils in the array and not the remainder of coils in the array of transmitting coils. The magnitude of the AC input signal applied may be the same across the subset of coils or vary amongst the subset, for example proportionally to the amplitude of the calibration signal received by a respective coil. In any case, power is more efficiently transferred between the charging unit 510 and the receive unit 520. This method assumes that the position of the receive unit 520 remains fixed in relation to the charging unit 510 during the charging process.

In a variant, the method may be modified to help align the receive unit 520 with the charging unit 510. For example, the receive unit 520 may begin transmitting the calibration signal as it moves towards the charging unit 510 but before reaching a final destination. As the receive unit 520 is moving, the charging unit 510 continually evaluates the strength of the calibration signal at each of the coils in the array of transmit coils 512. By knowing the position of the coils in the array in relation to each other, the position of the receive unit 520 and its relative motion to the charging unit 510 can be determined from the amplitude of the calibration signals received. An indicia of the position of the receive unit 520 and its relative motion can be presented, for example to the driver of the electric vehicle. For example, the electric vehicle hosting the receive unit 520 may be depicted visually in relation to the charging pad, thereby assisting the driver with alignment.

A method for detecting objects which interfere with the charging process is also contemplated by this disclosure. When a metal piece exists between the array of transmitting coils and the receive coil, an Eddy current is induced in the metal piece due to the magnetic field changes. The magnetic field generated by this Eddy current induces voltage phase and frequency alterations between the coils. This difference in the amplitude, phase and frequency of induced voltage or current in the array of transmitting coils 512 can be used to detect objects which may interfere with the power transfer process. More specifically, when there is a conductive object near the wireless power transfer system, because of the Eddy current induced in the foreign object, the inductance in the system will change. When inductance changes, the resonant frequency in the system changes. By detecting a change of the resonant frequency, the effect of foreign objects on the system can be detected. Likewise, a change is phase can also be used to detect objects.

The largest phase shift will occur for large and thick inductive metal objects made from good conductors like gold, silver, and copper. Smaller phase shifts are typical for smaller and thinner resistive objects composed of less conductive materials. Purely ferromagnetic materials, including most soils and sands, are reported as having little or no phase shift. But the largest frequency changes appear in ferromagnetic objects. Smaller frequency changes will occur in metal objects, such as copper, iron, etc. Notable changes in the amplitude of voltage or current occur for metal objects with good inductive properties while little changes in amplitude are caused by ferromagnetic materials.

Figure 16:
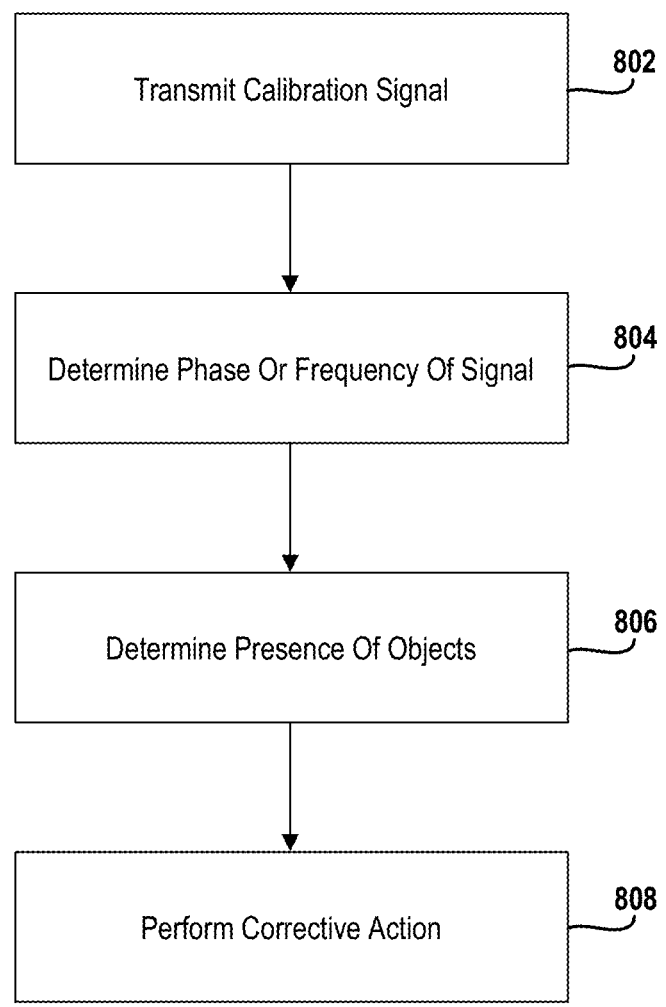
FIG. 16 is a flowchart depicting an example method for detecting an object which may be interfering with power transmission.

With reference to FIG. 16, an object can be detected using a calibration signal transmitted at 802 from the receive unit 520 to the charging unit 510. The calibration signal is in turn processed by a controller of the charging unit 510 to determine the presence of an object that may interfere with the charging process.

To do so, the frequency (or phase) of the calibration signal received at one or more of the transmitting coils is determined at 804. The presence of an object is then determined at 806 by evaluating the change in frequency (or phase) of the calibration signal received at one or more of the transmitting coils. A change in frequency (or phase) is quantified by computing a difference between the frequency (or phase) of the received calibration signal and an expected frequency (or phase) for the calibration signal. The change is then compared to a predefined threshold. An object is deemed present when the change in frequency (or phase) exceeds the threshold.

Different correction actions may be taken upon detecting the presence of an object. For example, an indicia of the detected object can be presented, for example to the driver of the electric vehicle. The driver can then act to investigate and remove the obstructing object. Further analysis of the changes in frequency (or phase) detected amongst the different coils in the array of transmitting coils can also yield the position of the object in the system. Given the position of the obstruction, coils in the array having the least amount of interference from the detected object can be energized during the charging process. In this way, actions can be taken to account for the obstructing object to improve the charging process.

Some aspects of this disclosure may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wireless power transmission system, comprising:
   a charging unit configured to transfer power using inductive power transfer and includes:
      a power source;
      a rectifier configured to receive an alternating current (AC) input signal from the power source and convert the AC input to a direct current (DC) power;
      an inverter configured to receive the DC power from the rectifier and convert the DC power to an AC output signal at a desired resonant frequency; and
      a transmit coil configured to receive the AC output signal from the inverter and generate an alternating electromagnetic field, wherein the transmit coil has a spirangle arrangement segmented into n coil segments and capacitors interconnecting adjacent coil segments;
   a receive unit configured to receive power via inductive power transfer from the transmitting coil of the charging unit and includes:
      a receive coil configured to receive the alternating electromagnetic field from the transmitting coil of the charging unit of the inverter and output an AC charging signal, wherein the receive coil has a spirangle arrangement segmented into m coil segments and capacitors interconnecting adjacent coil segments, where n and m are integers greater than two; and
      an output rectifier configured to receive the AC charging signal from the receive coil and convert the AC charging signal to a DC charging signal.

2. The wireless power transmission system of claim 1 wherein length of each coil segment in the transmit coil is sized to distribute voltage in the capacitors evenly.

3. The wireless power transmission system of claim 2 wherein the length of coil segments in the transmit coil vary.

4. The wireless power transmission system of claim 1 wherein the spirangle arrangement of at least one of the transmit coil and receive coil has a rectangular shape.

5. The wireless power transmission system of claim 1 wherein the spirangle arrangement of at least one of the transmit coil and receive coil is a polygon shape having five or more sides.

6. The wireless power transmission system of claim 1 wherein the spirangle arrangement for at least one of the transmit coil and the receive coil are three dimensional.

7. The wireless power transmission system of claim 1 wherein the transmit coil having a length, a width and a height, where the height of the transmit coil align substantially with a vector representing of magnetic field and is larger than the width, thereby reducing Eddy current losses.

8. The wireless power transmission system of claim 1 wherein the transmit coil further includes a plurality of magnetic members disposed adjacent to the transmit coil and the plurality of magnetic members are comprised of high-permeability material.

9. The wireless power transmission system of claim 8 wherein the plurality of magnetic members are arranged to increase inductance in the transmit coil.

10. The wireless power transmission system of claim 8 wherein each of the plurality of magnetic members is comprised of a material selected from the group of steel, ferrite and magnetic iron.

11. A charging unit for use in wireless power transmission system, comprising:
    a power source;
    a rectifier configured to receive an alternating current (AC) input signal from the power source and convert the AC input to a direct current (DC) power;
    an inverter configured to receive the DC power from the rectifier and convert the DC power to an AC output signal at a desired resonant frequency; and a transmit coil configured to receive the AC output signal from the inverter and generate an alternating electromagnetic field, wherein the transmit coil has a spirangle arrangement segmented into n coil segments and a capacitor interconnects adjacent coil segments, where n is an integer greater than two.

12. The wireless power transmission system of claim 11 wherein length of each coil segment in the transmit coil is sized to distribute voltage in the capacitors evenly.

13. The wireless power transmission system of claim 11 wherein the spirangle arrangement of the transmit coil has a rectangular shape.

14. The wireless power transmission system of claim 11 wherein the spirangle arrangement of the transmit coil is a polygon shape having five or more sides.

15. The wireless power transmission system of claim 11 wherein the spirangle arrangement for the transmit coil is three dimensional.

16. The wireless power transmission system of claim 11 wherein the transmit coil having a length, a width and a height, where the height of the transmit coil align substantially with a vector representing of magnetic field and is larger than the width, thereby reducing Eddy current losses.

17. The wireless power transmission system of claim 11 wherein the transmit coil further includes a plurality of magnetic members disposed adjacent to the transmit coil and the plurality of magnetic members are comprised of high-permeability material.

18. A charging unit for use in wireless power transmission system, comprising:
  a power source;
  a rectifier configured to receive an alternating current (AC) input signal from the power source and convert the AC input to a direct current (DC) power;
  an inverter configured to receive the DC power from the rectifier and convert the DC power to an AC output signal at a desired resonant frequency; and
  a transmit coil configured to receive the AC output signal from the inverter and generate an alternating electromagnetic field, wherein the transmit coil has a spirangle arrangement segmented into n coil segments and a capacitor interconnects adjacent coil segments, such that n is an integer greater than two;
  wherein the length of coil segments in the transmit coil vary and each coil segment in the transmit coil is sized to distribute voltage in the capacitors evenly.

* * * * *